US012664299B2

(12) United States Patent
Yajnik et al.

(10) Patent No.: US 12,664,299 B2
(45) Date of Patent: Jun. 23, 2026

(54) TECHNIQUES FOR PREVENTING PROHIBITED ACCESS TO SECURE CONTENT

(71) Applicant: Capital One Services, LLC, McLean, VA (US)

(72) Inventors: Sanjiv Yajnik, McLean, VA (US); Reuben John, Mountain House, CA (US); Robin Mathews, Bellevue, WA (US); Ajmal Karuthakantakath, Flower Mound, TX (US); Suresh Navayamkunnil Raghavan, McKinney, TX (US); Jordan Donais, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/017,391

(22) Filed: Jan. 10, 2025

(65) Prior Publication Data

US 2025/0238541 A1    Jul. 24, 2025

Related U.S. Application Data

(60) Provisional application No. 63/624,037, filed on Jan. 23, 2024.

(51) Int. Cl.
*G06F 21/06* (2006.01)
*G06F 21/62* (2013.01)

(52) U.S. Cl.
CPC ........ *G06F 21/6218* (2013.01); *G06F 21/629* (2013.01)

(58) Field of Classification Search
CPC . G06F 21/6218; G06F 21/629; G06F 21/6209
See application file for complete search history.

(56) References Cited

U.S. PATENT DOCUMENTS

| | | | | |
|---|---|---|---|---|
| 2020/0100106 A1* | 3/2020 | Black | .................... | H04W 12/06 |
| 2020/0364188 A1* | 11/2020 | Hintermeister | ....... | G06F 16/122 |
| 2023/0214508 A1* | 7/2023 | Munisamy | .............. | G06F 21/10 |
| | | | | 726/29 |

* cited by examiner

*Primary Examiner* — Ajay M Bhatia
*Assistant Examiner* — Cindy Nguyen
(74) *Attorney, Agent, or Firm* — Foley & Lardner LLP

(57) ABSTRACT

Systems and methods for improving access to and control of secure content. To prevent undesired data sharing/access (e.g., prohibited downloads, 4th, 5th-party sharing), access rules can be assigned to documents upon creation. These access rules specify the operations that can be performed to a document, who can perform those operations, and when those documents can be accessed to perform the operations. For each document, a separate container instance may be generated which can store the document comprising the private data. Each authorized user may be provided with their own container instance. Unique cryptographic keys may be generated for each container instance to allow those authorized users to securely connect to their respective container instances. This additional layer of protection (i.e., access rules linked to documents and unique keys for each document/client) allows for granular monitoring of the private data to prevent prohibited access attempts.

19 Claims, 6 Drawing Sheets

400

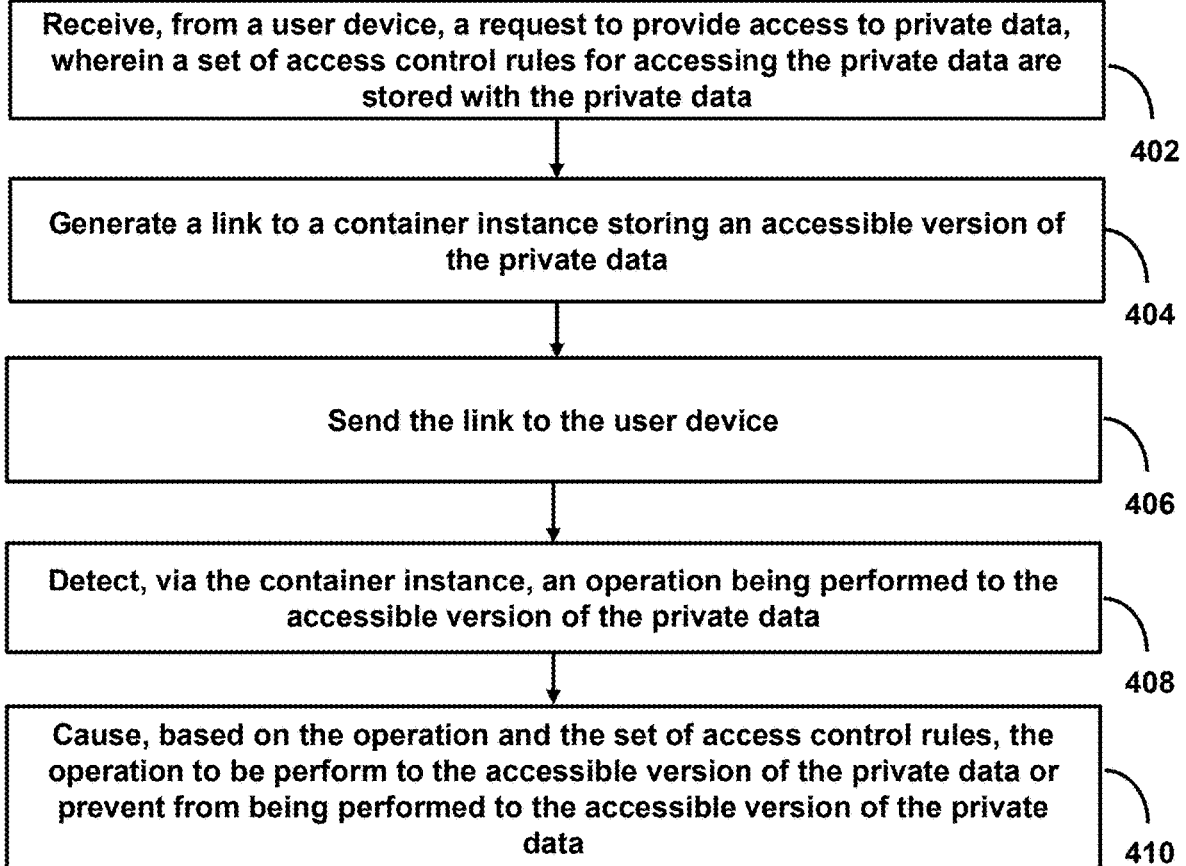

Receive, from a user device, a request to provide access to private data, wherein a set of access control rules for accessing the private data are stored with the private data

402

Generate a link to a container instance storing an accessible version of the private data

404

Send the link to the user device

406

Detect, via the container instance, an operation being performed to the accessible version of the private data

408

Cause, based on the operation and the set of access control rules, the operation to be perform to the accessible version of the private data or prevent from being performed to the accessible version of the private data

TECHNIQUES FOR PREVENTING PROHIBITED ACCESS TO SECURE CONTENT

CROSS-REFERENCE TO RELATED APPLICATION(S)

This application claims the benefit of priority of U.S. Provisional Patent Application No. 63/624,037, filed Jan. 23, 2024. The content of the foregoing application is incorporated herein in its entirety by reference.

BACKGROUND

Unwanted data exposure is an ongoing concern of users and entities. There are many ways that data can be exposed to security risks. For example, transmitting files across file sharing sites, attaching files to emails, and/or sharing files (such as within a multi-user collaboration environment), each pose their own unique security concerns.

SUMMARY

In view of the technical problems associated with maintaining access control to secure content, systems and methods disclosed herein provide enhanced cryptographic security for secure content. In particular, to prevent undesired data sharing/access (e.g., prohibited downloads, 4th, 5th-party sharing), access rules are assigned to documents upon creation. These access rules specify the operations that can be performed to a document, who can perform those operations, and when those documents can be accessed to perform the operations. For each document, a separate container instance may be generated which can store the document comprising the private data. Each authorized user (i.e., a user permitted to perform some or all of the operations to the document) may be provided with their own container instance, storing a separate version of the document. Unique cryptographic keys may be generated for each container instance, where the keys, the access rules, and the secure documents are stored in a secure file database. The keys may be provided to corresponding users to allow those authorized users to securely connect to their respective container instances. This additional layer of protection (i.e., access rules linked to documents and unique keys for each document/client) allows for granular monitoring of the private data to prevent prohibited access attempts.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 illustrates a flowchart of an example process for providing secure access to private data, in accordance with various embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
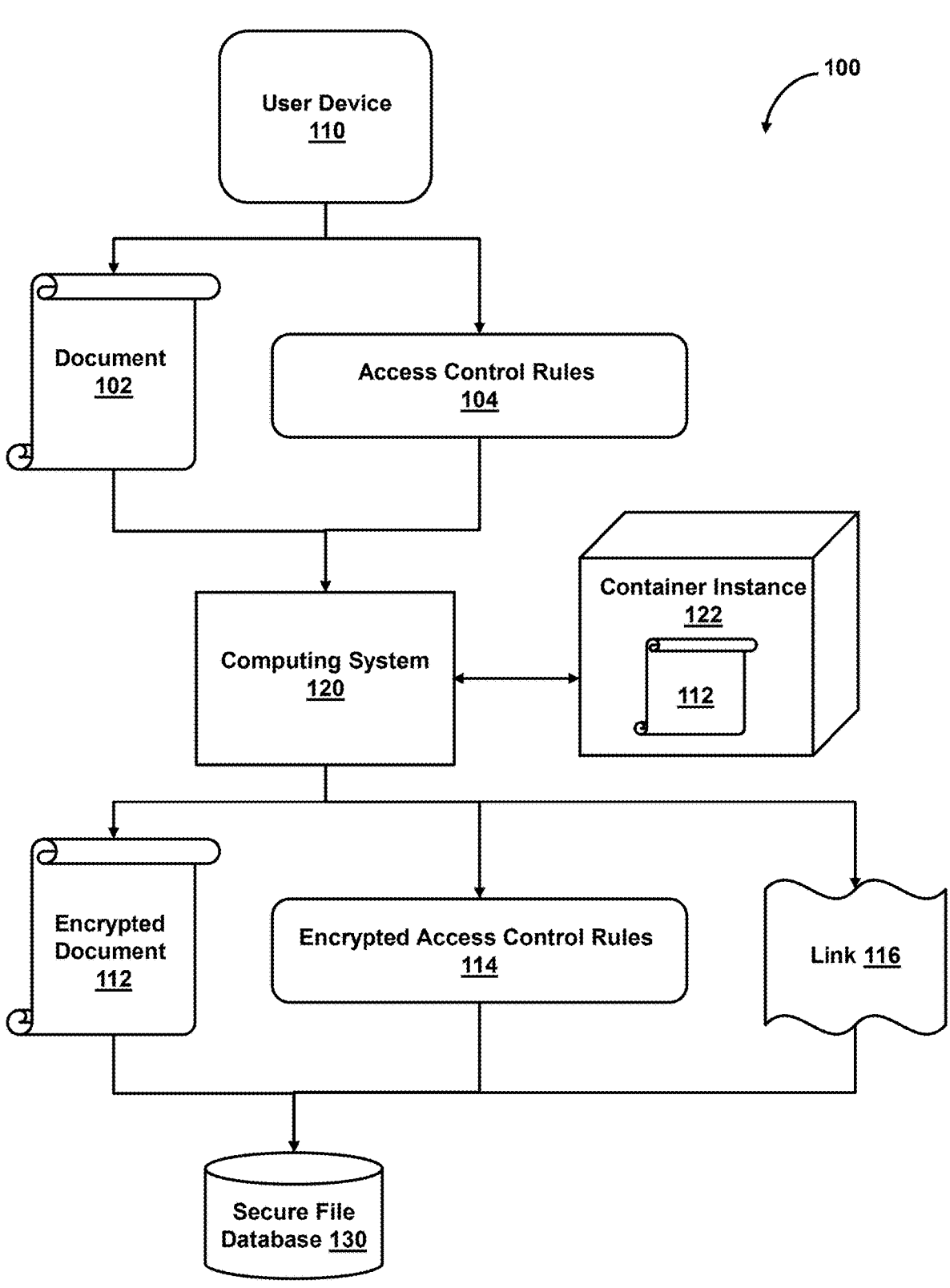
FIGS. 1A-1C illustrate example systems for providing secure access to private data, in accordance with various embodiments.
Figure 1B:
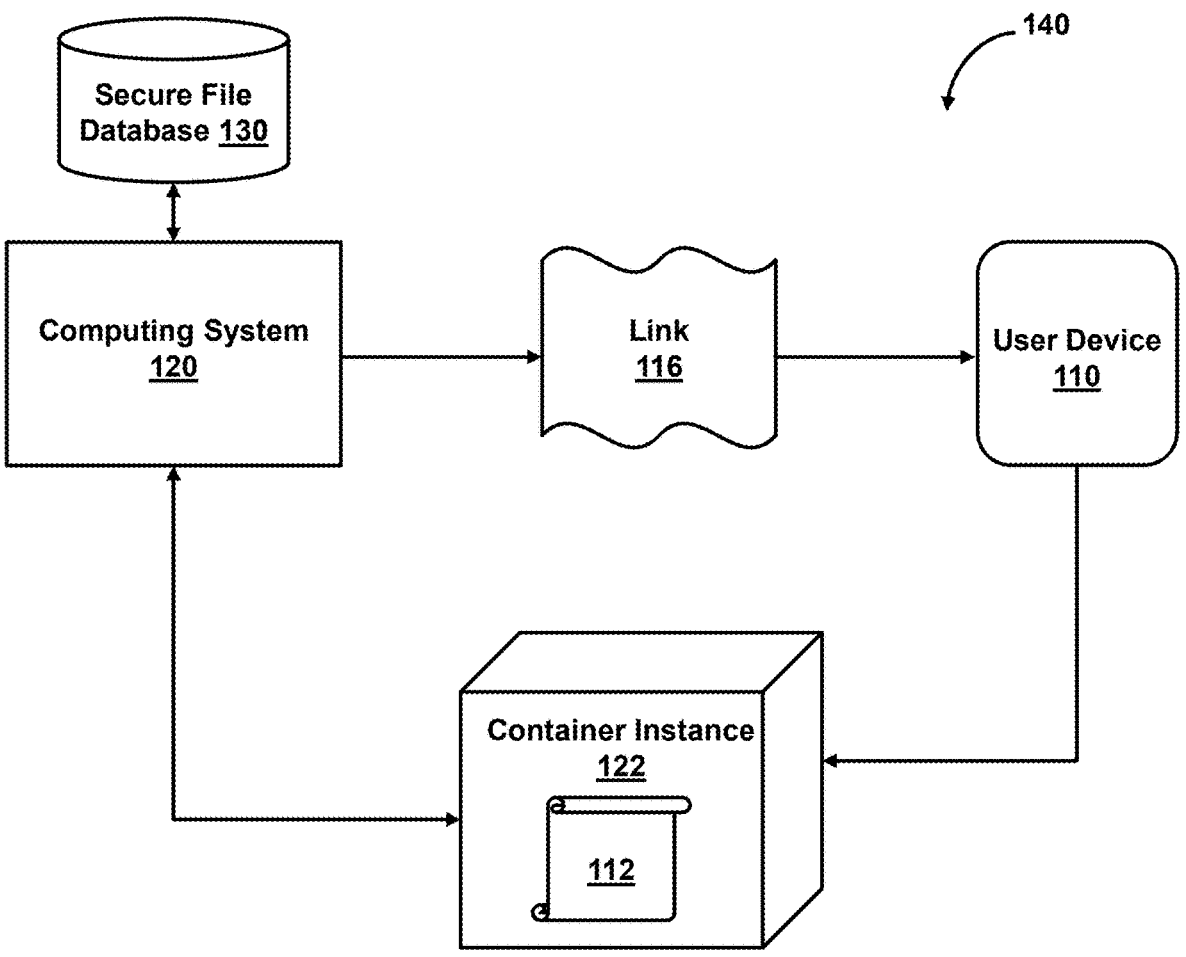
Figure 1C:
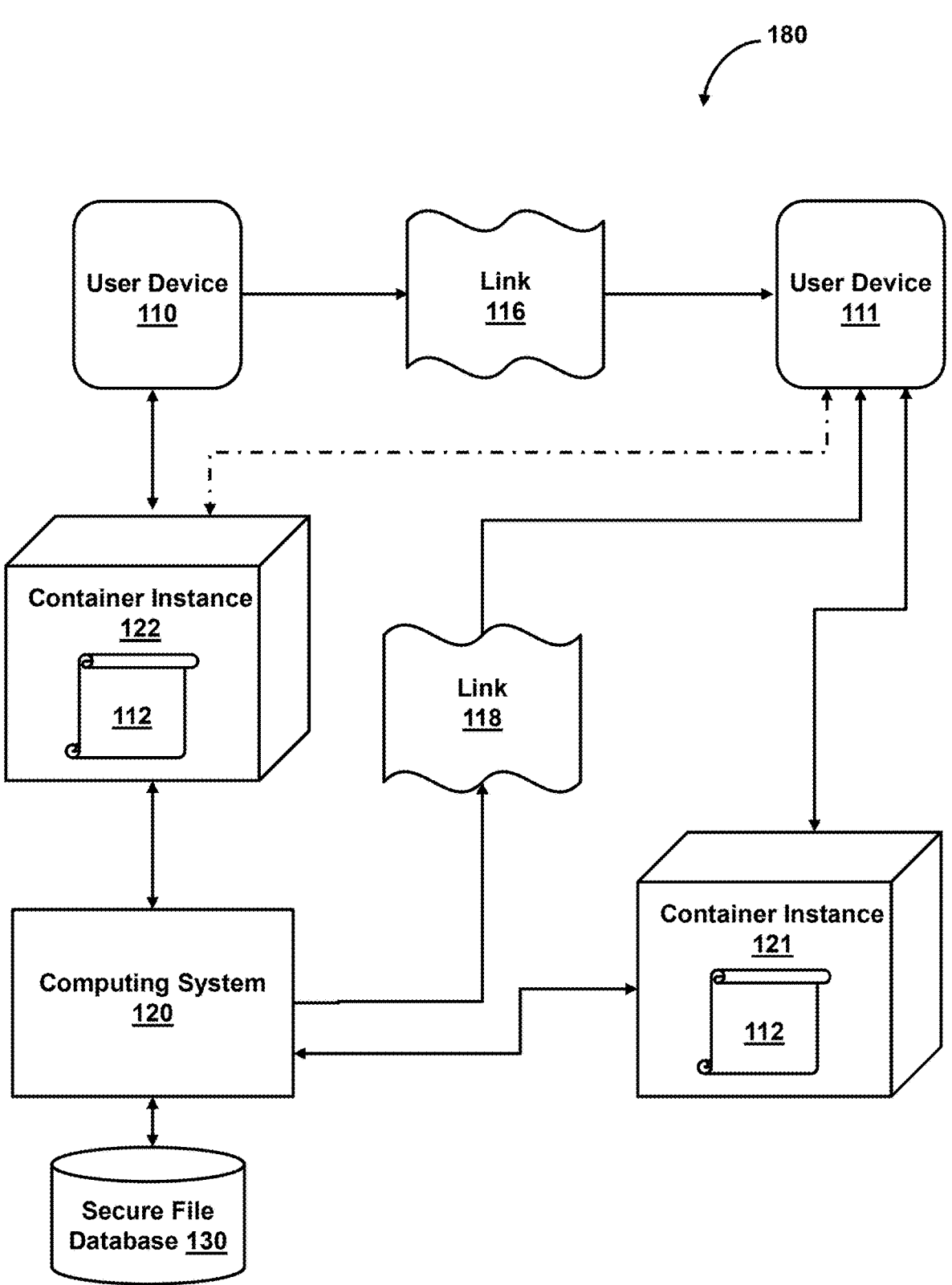

FIGS. 1A-1C illustrate example systems 100, 140, and 180 for providing secure access to private data, in accordance with various embodiments. In some embodiments, systems 100, 140, and 180 may include user device 110, computing system 120, secure file database 130, and/or other components. User device 110, computing system 120, secure file database 130 may communicate with one another via a network, such as the Internet. Although a single instance of user device 110, computing system 120, and secure file database 130 are represented within system 100, 140, and 180, multiple instances of user device 110, computing system 120, secure file database 130, or any other component, may be included, and the single instance of each is to minimize obfuscation within FIGS. 1A-1C.

The network may be a communications network including one or more Internet Service Providers (ISPs). Each ISP may be operable to provide Internet services, telephonic services, and the like, to one or more devices, such as user device 110 and/or computing system 120. In some embodiments, the network may facilitate communications via one or more communication protocols, such as TCP/IP, HTTP, WebRTC, SIP, WAP, Wi-Fi (e.g., 802.11 protocol), Bluetooth, radio frequency systems (e.g., 900 MHZ, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

User device 110 may include one or more processors, memory, communications components, and/or additional components (e.g., display interfaces, input devices, etc.). User device 110 may include any type of mobile terminal, fixed terminal, or other device. By way of example, user device 110 may include a desktop computer, a notebook computer, a tablet computer, a smartphone, a wearable device, or other client device. Users may, for instance, utilize user device 110 to interact with one another, computing system 120, one or more servers, or other components.

In some embodiments, systems 100, 140, and 180 may illustrate techniques for controlling access to private data. In particular, the techniques discussed below prevent unauthorized users from accessing private data and/or limit the number, type, and/or frequency of operations permitted to be performed to the private data. This provides improvements over existing techniques for controlling access to private data by (i) defining who can access the data, (ii) defining what can be done to the data, (iii) preventing access to the data for unauthorized users and unauthorized actions, (iv) encrypting the data and access control rules to add another layer of security, and (v) providing a secure computing environment for authorized users to access the data and perform permitted operations to/with the data.

With reference to FIG. 1A, system 100 may describe an example whereby a document 102 may be created by a user via user device 110. User device 110 may be associated with an authorized user of computing system 120. In some examples, a user operating user device 110 may perform one or more verification steps to enable communications with computing system 120. For example, an authorized user of computing system 120 (or a service provided by computing system 120) may input a username, password, biometric data, or other data to be granted access to computing system 120.

In some embodiments, computing system 120 may be configured to receive, from user device 110, a request to provide access to private data. For example, document 102 may comprise the private data for which access is being requested. In some cases, the private data (e.g., document 102) may be created using user device 110. Upon document 102 being created, a set of access control rules 104 for accessing the private data included by document 102 may be created. Access control rules 104 may be stored with the private data (e.g., document 102). For example, access control rules 104 may be linked to document 102.

In some embodiments, document 102 may be generated such that it includes private data. Some examples of private data include personal information, medical information, educational information, financial information, and the like, associated with one or more individuals and/or entities. Access control rules 104 may be created at a same time as document 102. For example, after creating document 102, computing system 120 may prompt an authorized user to specify access control rules 104. Access control rules may specify how to access the private data via document 102.

In some embodiments, prior to the access request being received, computing system 120 may receive a request to upload a document (e.g., document 102) comprising the private data to secure file database 130. As described herein, secure file database 130 may be configured to store an encrypted version of document 102 (e.g., encrypted document 112). Furthermore, secure file database 130 may be configured to store an encrypted version of access control rules 104 (e.g., encrypted access control rules 114). In one or more examples, access control rules 104, 114 are defined with document 102, 112. In particular, access control rules 104 may specify (i) actions that are permitted to be performed with document 102 and (ii) user devices that are permitted to access the document (e.g., user device 110).

In some embodiments, computing system 120 may be configured to encrypt document 102, access control rules 104, and/or other data associated with the private data requesting to be accessed. For example, computing system 120 may perform one or more encryption algorithms to document 102 and access control rules 104 to generate encrypted document 112 and encrypted access control rules 114, respectively. As an example, the encryption techniques may include secret-key, public key, hash functions, and the like. In some embodiments, user device 110 may include a private key and/or digital signature. For example, system 100 may use cryptographic systems to encrypt documents and access control rules to manage and control the accessibility of private data. Public-key cryptography may use a pair of digital keys (e.g., which may comprise strings of data). In such cases, each pair comprises a public key (e.g., which may be public) and a private key (e.g., which may be kept private). Computing system 120 may generate the key pairs using cryptographic algorithms (e.g., featuring one-way functions). Computing system 120 may then encrypt document 102 and access control rules 104 to obtain encrypted document 112 and encrypted access control rules 114. Using an intended receiver's public key, an encrypted message may be decrypted only with the receiver's corresponding private key. In some embodiments, computing system 120 may combine a message with a private key to create a digital signature on the message, which can be used for verification purposes.

In some embodiments, encrypted document 112, encrypted access control rules 114, and/or other data, may be securely stored with secure file database 130. In some examples, secure file database 130 may also store some or all private/public keys.

In some embodiments, computing system 120 may further be configured to generate a link 116 to a container instance 122. Container instance 122 may store an accessible version of the private data. For example, an accessible version of encrypted document 112 may be stored by container instance 122. Link 116 may additionally be stored by secure file database 130. In some embodiments, a container instance may be generated for each access request. In some embodiments, a container instance may be generated for each authorized user. Each container instance that is generated may comprise a stand-alone, executable package that includes code, runtime, system tools, system libraries, and settings that are configured to execute one or more permitted operations.

In some embodiments, container instance 122 may be an AWS Lambda compute instance, Oracle Cloudx compute instance, Google Cloud Functionsx virtual machine, Microsoft Azure Functions host instance, Apache Open-Whisk instance, or other container instance. Container instance 122 can be hosted in the serverless architecture of a cloud compute service (e.g., computing system 120 may be a cloud compute service). Container instance 122 may include one or more processors, input/output ("I/O") devices, and memory for storing container functions, file pointers (to data stored in secure file database 130), and container data.

Container instance 122, in some embodiments, may include a stand-alone, executable package that includes code, runtime, system tools, system libraries, and settings that are configured to execute one or more operations. For example, the operations may include data modification operations, sharing operations, download operations, printing operations, saving operations, and other operations, or combinations thereof. Container instance 122 may be scaled for the number of users attempting to access encrypted document 112. Container instance 122 can be configured to execute functions written in one or more programming languages, including JAVASCRIPT, C, C++, JAVA, PHP, PYTHON, RUBY, PERL, BASH, or other programming languages. In some examples, container instances are ephemeral and may run for a single task or multiple tasks.

Container instance 122 may be a closed container. That is, container instance 122 may be configured to block attempts to access the container (or the private data stored thereby) and does not permit access from outside using terminals or remote shell tools like SSH, RTP, FTP, or Curl, for example. Accordingly, container instance 122 provides security benefits. For example, container instance 122 may include key-value pairs. In some examples, the key-value pairs may be encrypted. Container instance 122 may also decode or decrypt encrypted document 112 to obtain the private data stored in (non-encrypted) document 102.

In some embodiments, computing system 120 may be configured to send link 116 to user device 110. As an example, with reference to FIG. 1B, system 140 may include computing system 120 sending link 116 to user device 110. In one or more examples, the link may be retrieved by computing system 120 from secure file database 130 and sent to user device 110 upon being retrieved. Link 116 may allow an authorized user of user device 110 to communicate with container instance 122 to perform one or more operations with encrypted document 112 (which may be decrypted server or client side).

In some embodiments, as seen with reference to system 180 of FIG. 1C, computing system 120 may detect, via container instance 122, an operation being performed to the accessible version of the private data (e.g., encrypted document 112). Computing system 120 may determine, based on encrypted access control rules 114, whether the authorized user operating user device 110 is permitted to perform the operation to encrypted document 112 stored via container instance 122. If it is determined, based on encrypted access control rules 114, that the operation is not permitted, then computing system 120 may prevent user device 111 from access container instance 122. In this scenario, a new link, such as link 118 to a new container instance 121 may be generated. For example, computing system 120 may receive a request to generate a new link, link 118, to a new container instance 121 storing another accessible version of the private data (e.g., another copy of encrypted document 112). In some examples, container instance 121 may be the same or similar to container instance 122. However, container instance 121 may be encrypted using a different key-value pair (as it is associated with a different user device, user device 111). In some embodiments, based on the request to generate the new link (e.g., link 118) and the set of access control rules (e.g., encrypted access control rules 114), computing system 120 may determine that an unauthorized user, such as a user operating user device 111, has attempted to access the private data. Thereafter, if the authorized user associated with user device 110 is permitted to provide access to encrypted document 112, computing system 120 may generate container instance 121 which may be accessed by a user operating user device 111. Alternatively, if it is determined that the user associated with user device 110 is not permitted to perform the operation, then computing system 120 may prevent the operation from being executed via container instance 122. In this example, container instance 122 may disable one or more features to prevent the data from being accessed.

In some embodiments, computing system 120 may be configured to cause, based on the operation and access control rules 114, the operation to be performed to the accessible version of the private data (e.g., encrypted document 112) or may cause computing system to prevent the operation from being performed to the accessible version of the private data (e.g., encrypted document 112).

In some embodiments, computing system 120 may be configured to insert an event tracker into the private data. For example, computing system 120 inserts executable code into document 102 such that operations performed to document 102 (or encrypted document 112) are tracked. In one or more examples, a log file may be created to track each operation performed within the container instance (e.g., container instance 122). The log file may store tracked operations including interactions with the private data stored via the container instance or actions performed by a device attempting to access the private data. In one or more examples, the interactions with the private data comprise: editing at least some of the private data, downloading the private data, or sharing the private data, and the actions performed by the device attempting to access the private data comprise at least one of: keystrokes executed, touchscreen inputs, camera activity, screen shot activity, auxiliary device (e.g., pointer, mouse) inputs, or other actions, or combinations thereof. In some embodiments, one or more features of software for the container instance (e.g., container instance 122) may be disabled based on the interactions and/or actions detected. By disabling the features, computing system 120 can prevent the (impressible) operation from being performed. Furthermore, tracking the interactions and actions can enable computing system 120 to detect possible malicious user actions. For example, the user actions may indicate that the user is attempting to take a picture of the document. In some embodiments, certain features may be disabled upon detection of the possible malicious user actions. Furthermore, an audit of the document may enable such possible malicious user actions to be detected and prevented.

In some embodiments, computing system 120 may obtain event tracker data from the container instance (e.g., container instance 122). The event tracker data may comprise a set of interactions with the private data detected, via the container instance, using the event tracker. In some embodiments, one or more trained artificial intelligence models may be used to analyze the set of interactions to identify one or more patterns of interactions with the private data. For example, the AI models may detect frequent operations performed by users and predict operations that a user may attempt to perform. The AI models can thus be used to identify the operations that should be permitted, and the users with whom access is to be granted, in advance of the requests being received to access the private data.

In some embodiments, computing system 120 may be configured to enable real-time audit of documents including private data. Computing system 120 may attach an audit policy to the document (or the private data stored therein). The audit policy may specify a particular percentage or random sampling of documents to be audited. For example, computing system 120 may specify that 1%, 2%, 5%, 10%, or other percentages, of documents be audited. In some examples, the random sampling may result in a predefined number of documents being selected for auditing (e.g., 10 or more documents, 100 or more documents, 1,000 or more documents, etc.). In some embodiments, an auditor, system administrator, or other authorized user, may be configured to perform the audits. The audits may be performed using computing system 120 or using another device in communication with computing system 120. Furthermore, the auditor can select and/or modify a granularity (e.g., document level) of the audit. Further still, in some embodiments, computing system 120 can attach a workflow to the audit process with appropriate escalations/reminders to perform audit/attestation within the configured time threshold.

In some embodiments, each interaction of the set of interactions may be added to a digital ledger tracking interactions with the private data. A digital ledger, also referred to interchangeably as a "blockchain," may employ blockchain technology for various applications, including, but not limited to, smart contracts, non-fungible tokens, cryptocurrency, smart finance, blockchain-based data storage, etc. (referred to collectively herein as blockchain applications). Each of these applications benefits from blockchain technology that allows for the recording of information that is difficult or impossible to change (either in authorized or unauthorized manner). For example, a blockchain is essentially a digital ledger of transactions that is duplicated and distributed across an entire network of computer systems on the blockchain (e.g., computing system 120, user device 110, etc.). That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

In some embodiments, computing system 120 and user device 110 (and any other user devices) included within systems 100, 140, and/or 180, may comprise a distributed state machine, in which each of the components acts as a client of the system. For example, systems 100, 140, 180 may comprise a large data structure that holds not only all accounts and balances but also a state machine, which can change from block to block according to a predefined set of rules, and which can execute arbitrary machine code. The specific rules of changing state from block to block may be maintained by a virtual machine (e.g., a computer file implemented on and/or accessible by a user device, which behaves like an actual computer) for the system. For example, system 100, 140, 180 may interact with, and facilitate the function of, a blockchain.

User device 110 (and 111) may be a smartphone, a personal computer, or a server. Alternatively, user device 110 may correspond to any type of computing device, including, but not limited to, a laptop computer, a tablet computer, a hand-held computer, and/or other computing equipment (e.g., a server), including "smart," wireless, wearable, and/or mobile devices. It should be noted that embodiments describing systems for performing a blockchain function may equally be applied to, and correspond to, an individual user device (e.g., user device 110, user device 111, and/or other devices) performing the blockchain function.

Each of the user devices may be used by the system to conduct blockchain functions and/or contribute to controlling access to private data (e.g., document 102). As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

In some embodiments, user device 110 may include a digital wallet used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As referred to herein, a cryptography-based digital repository may comprise a digital wallet. For example, a cryptography-based digital repository or a cryptography-based, storage application may refer to a digital wallet. A digital wallet may comprise a software-based system that securely (and typically in an encrypted format) stores users, confidential information, personal information, payment information, and/or passwords. for numerous payment methods and websites. By using a digital wallet, users can complete communications, purchases, and/or other blockchain operations easily and securely without risking the information becoming public or subject to a cyber-attack. For example, a custodial cryptography-based, storage application may be a cryptography-based, storage application that is managed by a third-party exchange. For example, the custodial cryptography-based, storage application may be a platform cryptography-based, storage application such that the custodial cryptography-based, storage application is managed by a blockchain platform service. For custodial cryptography-based, storage applications, an exchange (e.g., the blockchain platform service) may store and manage keys (e.g., private keys) corresponding to a user account (e.g., corresponding to a blockchain address). The exchange may be tasked with securely storing funds (e.g., cryptocurrencies) and/or facilitating blockchain operations based on the funds. In some embodiments, the custodial cryptography-based, storage application may be a cold storage hardware wallet. In such cases, the funds may be stored securely on designated hardware in order to provide additional security. Alternatively, some embodiments may use a non-custodial cryptography-based, storage application, which may be browser-based (e.g., software installed on mobile devices).

User device 110 may include a private key (e.g., key 212) and/or digital signature. For example, cryptographic systems may be used for conducting blockchain functions such as granting or preventing access to private data. For example, public-key cryptography, which features a pair of digital keys (e.g., which may comprise strings of data), may be used. In such cases, each pair comprises a public key (e.g., which may be public) and a private key (e.g., which may be kept private). In one or more examples, computing system 120 may generate key pairs using cryptographic algorithms (e.g., featuring one-way functions). Computing system 120 may then encrypt a message (or other blockchain function) using an intended receiver's public key such that the encrypted message may be decrypted only with the receiver's corresponding private key. In some embodiments, a message may be combined with a private key to create a digital signature on the message. For example, the digital signature may be used to verify the authenticity of blockchain functions. As an illustration, when conducting blockchain functions, the digital signature may be used to prove to every node in the system that it is authorized to conduct the blockchain functions.

The blockchain network may include a plurality of nodes, where each node may correspond to a user device (e.g., user device 110). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 110 may request a blockchain function (e.g., store a record of an access attempt). The blockchain function may be authenticated by user device 110 and/or another node of the blockchain network. For example, using cryptographic keys, authorized users may be identified and given access to their respective user accounts (e.g., corresponding digital wallets), encrypted documents 112, encrypted access control rules 114, or other data stored in secure file database 130. Using private keys (e.g., known only to the respective users) and public keys (e.g., known to the community network), digital signatures may be created to authenticate the users.

Following an authentication of the blockchain function, the blockchain function may be authorized. For example, after the blockchain function is authenticated between the users, the blockchain function may be authorized prior to being added to the blockchain. In some embodiments, the blockchain function may be added to the blockchain based on a consensus of the user devices within the blockchain network. For example, a majority (or other metric) of the nodes in the community network may be used to determine that the blockchain function is valid. In response to validation of the block, a node user device may receive a reward (e.g., in a given cryptocurrency) as an incentive for validating the block.

To validate the blockchain function, one or more validation protocols and/or validation (or consensus) mechanisms. For example, a POW mechanism in which a user device must provide evidence that it performed computational work to validate a blockchain function may be used. This mechanism can provide a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, a POS mechanism may be used whereby a user account (e.g., corresponding to a node on the blockchain network) is required to have, or "stake," a predetermined amount of tokens in order to recognize it as a validator in the blockchain network.

In response to validation of the block, the block can be added to the blockchain, and the blockchain function is completed. For example, to add the blockchain function, the successful node (e.g., the successful miner) encapsulates the blockchain function in a new block before transmitting the block throughout the community network of devices.

In some embodiments, computing system 120 may receive a modification, or a request to modify, one or more of access control rules 104. For example, the modification may be to enable a particular user device to receive a link to a new container instance for accessing encrypted document 112. As another example, the modification may be to remove access to encrypted document 112 for a particular user. Some other modification examples can include an update to a number of access attempts permitted, a number of share attempts permitted, download rules, printing rules, sharing rules, or viewing rules. In some embodiments, computing system 120 may be configured to provide an updated set of access control rules comprising the modification, to the container instance. Based on the modified access control rules, the operations can be performed or can be prevented from being performed.

In some embodiments, the modification may comprise an update to a time period specifying when the container instance is accessible to perform the operation to the accessible version of the private data. In this example, when determining whether the operation is to be performed or be prevented from being performed, computing system 120 may be configured to determine a current time associated with the requested operation and based on the current time and the updated time period, can prevent the operation from being performed (e.g., the current time being outside of the time period). Conversely, if the current time is within the updated time period, then the operation may be permitted.

In some embodiments, the request is received from an authorized user. Furthermore, the set of access control rules (e.g., access control rules 104, 114) may comprise resource locators of a set of user devices that the private data is permissible to be shared with. As an example, with reference to FIG. 2, secure file database 130 may include data structure 200 storing a list of documents stored within secure file database 130 (such as encrypted document 112). Each entry of data structure 200 may correspond to a different document identified using a document ID (e.g., document ID D1-DM). In some embodiments, in addition to a document identifier for each document stored in secure file database 130, data structure 200 may include a location identifier (e.g., L1-LM). For example, the location ID may comprise a pointer to a memory block storing the encrypted document. Data structure 200 may also store a set of access control rules (e.g., access control rules ACR1-ACRM) specifying operations that are permitted to be performed to that corresponding document. Additional data stored by data structure 200 for the documents stored in secure file database 130 may include a document creator (e.g., User_A, User_B, . . . , User_M), one or more encryption/decryption keys associated with the corresponding document (e.g., K1-KM), one or more links generated for each document, or other information.

Figure 2:
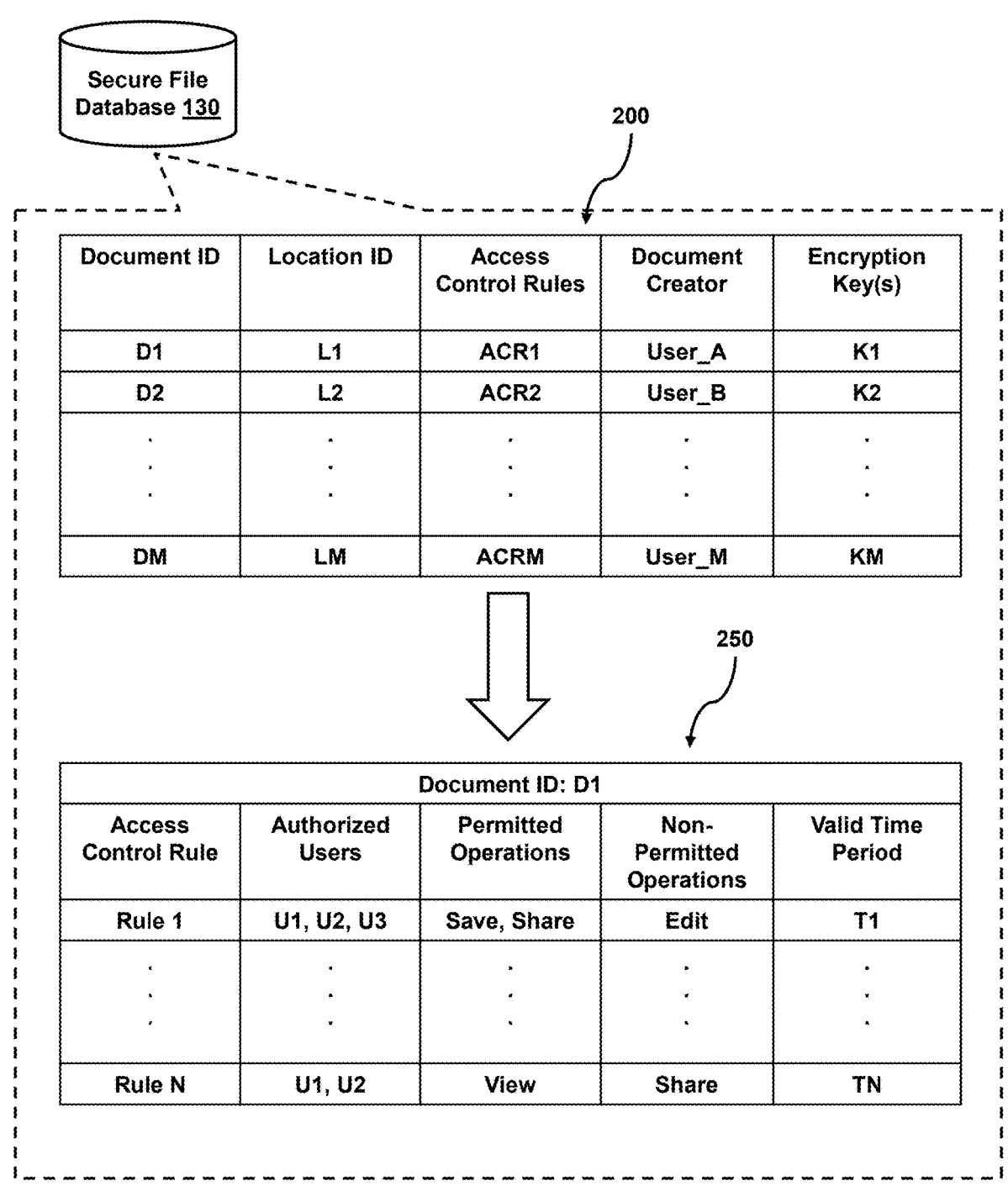
FIG. 2 illustrates a secure file database storing documents and access control rules, in accordance with various embodiments.

In some embodiments, secure file database 130 may further store a set of access control rules 250 for each document stored in secure file database 130 (e.g., the documents associated with document IDs D1-DM). In the example of FIG. 2, set of access control rules 250 may correspond to a document having the document ID: D1. As seen in FIG. 2, a set of access control rules may include a name or identifier (e.g., Rule 1-Rule N) of each access control rule assigned to that document. Different documents may have different quantities of access control rules; however, some access control rules may be the same (or substantially the same) for two or more documents.

Set of access control rules may specify, for each access control rule, the authorized users allowed to access the document, the operations that are permitted to be performed by those authorized users, optionally operations that are not permitted to be performed (by the authorized users and/or any user), a time period (e.g., time periods T1-TN) when the particular authorized users may perform the permitted operations, or other information or rules. As an illustrative example, the access control rule: Rule 1 may specify that the authorized users U1, U2, and U3 are permitted to perform one (or possible more) of a save operation (saving a copy of the document to local memory) and a share operation (sending a link to access a container instance storing the document). Rule 1 may also specify that authorized users U1, U2, and U3 can perform the permitted operations during a time period T1. If these users attempt to perform one of the permitted operations at a time outside of the valid time period, then the operation may be prevented from being performed. Rule 1 may also specify that no user, not even authorized users U1, U2, or U3 may perform a data editing operation. Documents may include different rules for different authorized users, or groups of authorized users. For example, Rule N may specify that authorized users U1 and U2 are permitted to view document D1 during time period TN, but authorized user U3 is not permitted to view document D1 during time period TN. However, Rule N may also specify that no user (authorized or not authorized) may be permitted to share the document. In some examples, additional criteria may also be included in the set of access control rules 250. For instance, a number of permitted instances that the document can be accessed or that the permitted operations can be performed may be included by set of access control rules 250.

In some embodiments, computing system 120 may generate a container instance for each user device of the set of user devices. Each user device may access an instance of encrypted document 112 using that user's corresponding container instance. In some examples, a link to each container instance may be generated for each user device. For instance, the link can be specific to one of the resource locators of a corresponding user device from the set of user devices. Each link to the corresponding user device. For example, with reference again to FIG. 1C, link 116 may be generated for the authorized user of user device 110 to allow that user to access encrypted document 112 via container instance 122 whereas link 118 may be generated for the authorized user of user device 111 to allow that user to access encrypted document 112 via container instance 121.

In some examples, the accessible version of the private data comprises an encrypted version of the private data. For example, container instance 122 may allow encrypted document 112 comprising the private data to be accessed. Link 116 to container instance 122 may be a secure link. The link can be specific to the user device (e.g., link 116 for user device 110, link 118 for user device 111) and the container instance can be specific to an authorized user associated with that user device (e.g., container instance 122 for user device 110, container instance 121 for user device 111). In one or more examples, the link comprises a Hypertext Transfer Protocol Secure (HTTPS) link to provide a first layer of encryption and the private data is encrypted using one or more encryption algorithms to provide a second layer of encryption (e.g., private/public keys). This can provide an additional level of encryption over existing HTTPS capabilities. The auto-generated asymmetric key-pairs may provide the additional level of encryption.

In some embodiments, computing system 120 may permit a download operation to be performed to allow an authorized user to download a copy of at least some of the private data (e.g., encrypted document 112). In one or more examples, the downloaded copy may be decrypted using the authorized user previously created encryption keys. In some examples, computing system 120 may determine whether the download operation is to be performed or is to be prevented from being performed by determining whether the set of access control rules permit downloading of the private data. In other words, do any of Rule 1-Rule N include, as a permitted operation, a download operation and is that operation permitted to be performed by the user currently requesting that operation. If computing system 120 determines that the access control rules (e.g., access control rules 250 of FIG. 2) permits downloading of the private data, computing system 120, via container instance 122, may be configured to generate a downloadable version of the private data including a digital signature. For example, a digital watermark may be added to encrypted document 112.

Figure 3:
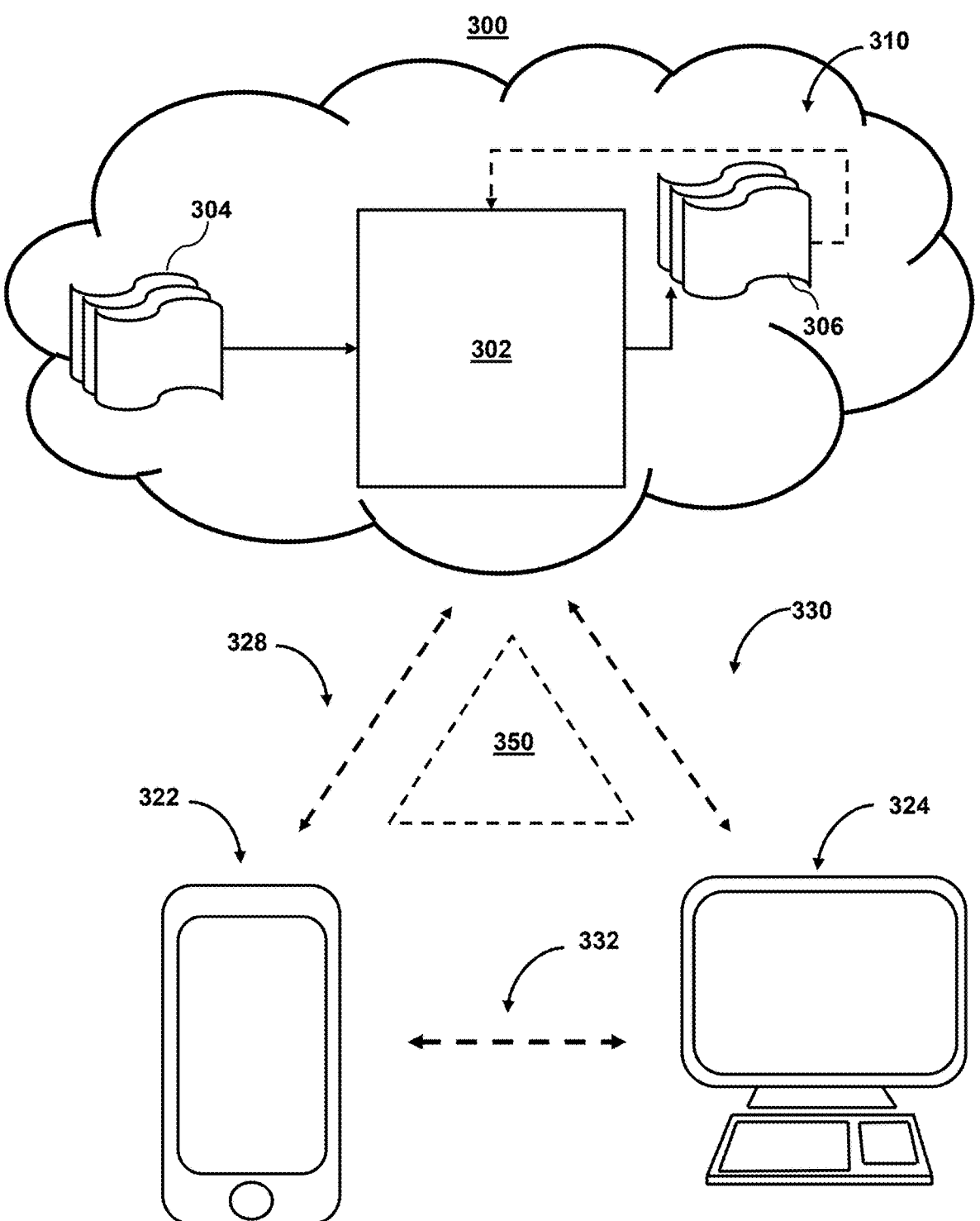
FIG. 3 illustrates an example system for providing secure access to private data, in accordance with various embodiments.

FIG. 3 shows illustrative components for a system used to provide secure access to private data, in accordance with one or more embodiments. For example, FIG. 3 may show illustrative components for managing, maintaining, and controlling access to private data. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. As referred to herein, user device 110, 111 may be the same or similar to mobile device 322.

FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. As an illustrative example, computing system 120 may be implemented using cloud components 310. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include secure file database 130. This can enable cloud components 310 may access a blockchain network storing tracked operations performed to/with the encrypted document (e.g., blocks representing events, such as container instance provisioning, document sharing, etc.). In some embodiments, cloud components 310 may include model 302, which may be a machine learning model, artificial intelligence model, deep learning model, etc. (which may be referred collectively as "models" herein). In some cases, model 302 may be used to analyze interactions with documents to predict user behaviors, predict which users should be authorized to access a document, predict the operations to be permitted/disabled for each authorized user, and/or perform other predictions.

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to predict access control rules for documents. In some embodiments, the predicted access control rules may be assigned to a newly created document. An administrator may modify one or more of the predicted access control rules as needed. In one or more examples, a workflow may be set for each document such that approval from an administrator or another supervising account is not needed to review the document.

System 300 also includes API layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

FIG. 4 illustrates a flowchart of an example process 400 for providing secure access to private data, in accordance with various embodiments. Persons of ordinary skill in the art will recognize that the ordering of steps is not intended to be immutable, and certain steps may be performed in a different order. Furthermore, while the steps are described with respect to aspects of computing system 120, some steps, or aspects thereof, may be performed by other devices (e.g., user devices 110, 111).

In some embodiments, process 400 may begin at step 402. At step 402, a request to provide access to private data may be received from a user device. In one or more examples, a set of access control rules for accessing the private data may be stored with the private data. For example, document 102, 112 and access control rules 104, 114 may be stored together in secure file database 130.

At step 404, a link to a container instance storing an accessible version of the private data may be generated. The generated link may be for a specific authorized user associated with the requested user device. In some examples, the generated link may include encryption/decryption data (e.g., keys) for accessing the container instance storing the private data.

At step 406, the link may be sent to the user device. In some examples, the link may be sent using HTTPS.

At step 408, an operation being performed to the accessible version of the private data may be detected via the container instance. The container instance may facilitate a user's interaction with the private data stored therein. In some examples, the operation may comprise a save operation, a download operation, a modification operation, a sharing operation, and the like.

At step 410, the operation may be performed to the accessible version of the private data, or the operation may be prevented from being performed to the accessible version of the private data. In one or more examples, the operation being performed or prevented from being performed may be based on the particular operation and the set of access control rules. As mentioned above, the access control rules may specify which operations are permitted to be performed to a document by an authorized user.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for controlling access to private data.

2. The method of embodiment 1, comprising: receiving, from a user device, a request to provide access to private data, wherein a set of access control rules for accessing the private data are stored with the private data; generating a link to a container instance storing an accessible version of the private data; sending the link to the user device; detecting, via the container instance, an operation being performed to the accessible version of the private data; and causing, based on the operation and the set of access control rules, the operation to be performed to the accessible version of the private data or prevent from being performed to the accessible version of the private data.

3. The method of any one of embodiments 1-2, further comprising: generating a document comprising the private data, wherein the set of access control rules specify how to access the private data via the document; encrypting the document and the set of access control rules; and storing the encrypted document using a secure file database.

4. The method of any one of embodiments 1-3, further comprising: inserting an event tracker into the private data, wherein the event tracker tracks at least one of interactions with the private data stored via the container instance or actions performed by a device attempting to access the private data.

5. The method of embodiment 4, wherein the interactions with the private data comprise at least one of: editing at least some of the private data, downloading the private data, or sharing the private data, and the actions performed by the device attempting to access the private data comprise at least one of: keystrokes executed, touchscreen inputs, auxiliary device (e.g., pointer, mouse) inputs, or screen shots, causing comprises: disabling a feature of software for the container instance to prevent the operation from being performed.

6. The method of embodiment 4 or 5, further comprising: obtaining, from the container instance, event tracker data comprising a set of interactions with the private data detected using the event tracker; and analyzing, using one or more trained artificial intelligence models, the set of interactions to identify one or more patterns of interactions with the private data.

7. The method of embodiment 6, further comprising: adding each interaction of the set of interactions to a digital ledger tracking interactions with the private data.

8. The method of any one of embodiments 1-7, wherein detecting the operation comprises: receiving a request to generate a new link to a new container instance storing another accessible version of the private data; determining, based on the request to generate the new link and the set of access control rules, that an unauthorized user has attempted to access the private data, wherein the accessible version of the private data is prevented from being accessed by the unauthorized user.

9. The method of any one of embodiments 1-8, further comprising: receiving a modification to one or more access control rules of the set of access control rules; and providing an updated set of access control rules comprising the modification to the container instance, wherein the operation is performed or prevented based on the updated set of access control rules.

10. The method of embodiment 9, wherein the modification comprises an update to at least one of: a number of access attempts permitted, a number of share attempts permitted, download rules, printing rules, sharing rules, or viewing rules.

11. The method of embodiment 9 or 10, wherein the modification comprises an update to a time period specifying when the container instance is accessible to perform the operation to the accessible version of the private data, causing comprises: determining a current time associated with the requested operation; and preventing the operation from being performed based on the current time being outside of the time period.

12. The method of any one of embodiments 9-11, wherein the request is received from an authorized user, the set of access control rules comprise resource locators of a set of user devices that the private data is permissible to be shared with.

13. The method of embodiment 12, further comprising: generating a container instance for each user device of the set of user devices; generating a link to each container instance, wherein the link is specific to one of the resource locators of a corresponding user device from the set of user devices; and sending each link to the corresponding user device.

14. The method of any one of embodiments 1-13, further comprising: prior to the request to access the private data being received, receiving a request to upload a document comprising the private data to a secure file database, wherein the secure file database stores an encrypted version of the document, and wherein the set of access control rules are defined with the document.

15. The method of embodiment 14, wherein the set of access control rules specify (i) actions that are permitted to be performed with the document and (ii) user devices that are permitted to access the document.

16. The method of any one of embodiments 1-15, wherein the accessible version of the private data comprises an encrypted version of the private data, and the link comprises a secure link.

17. The method of any one of embodiments 1-16, wherein the link is specific to the user device and the container instance is specific to an authorized user associated with the user device.

18. The method of any one of embodiments 1-17, wherein the link comprises a Hypertext Transfer Protocol Secure (HTTPS) link to provide a first layer of encryption and the private data is encrypted using one or more encryption algorithms to provide a second layer of encryption.

19. The method of any one of embodiments 1-18, wherein the operation comprises a download operation to download a copy of at least some of the private data, causing the operation to be performed or prevent comprises: determining whether the set of access control rules permit downloading of the private data; and based on the set of access control rules permitting downloading of the private data, generating a downloadable version of the private data including a digital signature.

20. A method for preventing unauthorized access to a document, comprising: receiving a request to upload a document and access control rules to the secure file database, wherein access control rules specify (i) actions that are permitted to be performed with the document and (ii) user devices that are permitted to access the document; encrypting the document and the access control rules to obtain an encrypted document and encrypted access control rules; storing, using the secure file database, the encrypted document and the encrypted access control rules; receiving, from the user device, a request to share the document with an unauthorized user; retrieving the encrypted access control rules to determine whether the authorized user is permitted to share the document with the unauthorized user; based on a determination that the encrypted access control rules permit the authorized user to share the document, generating and sending, to the user device, a link to a container instance storing the encrypted document, wherein the container instance comprises software for providing a virtual runtime environment for accessing the document; receiving, via the container instance, a notification that a request to download the document was made by the unauthorized user; and based on a determination that the encrypted access control rules comprise a rule that downloads of the document by the unauthorized user are impermissible, disabling a document download functionality of the container instance to prevent the unauthorized user from downloading the document.

21. A tangible, non-transitory, machine-readable medium storing instructions that, when executed by a data processing apparatus, cause the data processing apparatus to perform operations comprising those of any of embodiments 1-20.

22. A system comprising one or more processors; and memory storing instructions that, when executed by the processors, cause the processors to effectuate operations comprising those of any of embodiments 1-20.

23. A system comprising means for performing any of embodiments 1-20.

What is claimed is:

1. A system for preventing unauthorized access to a document, the system comprising:
a secure file database that stores encrypted documents;
a user device associated with an authorized user; and
a computing system programmed with computer program instructions to:
receive a request to upload a document and access control rules to the secure file database, wherein the access control rules specify (i) actions that are permitted to be performed with the document and (ii) a set of user devices that are permitted to access the document;
encrypt the document and the access control rules to obtain an encrypted document and encrypted access control rules;

store, using the secure file database, the encrypted document and the encrypted access control rules;
receive, from the user device, a request to share the document with an unauthorized user device associated with an unauthorized user;
responsive to receiving the request to share the document, retrieve the encrypted access control rules to determine whether the authorized user is permitted to share the document with the unauthorized user device;
based on a determination that the encrypted access control rules permit the authorized user to share the document, generate and send, to the user device, a link to a container instance storing the encrypted document, wherein the container instance comprises software providing a virtual runtime environment for accessing the document;
receive, via the container instance, a notification that a request to download the document was made by the unauthorized user device; and
based on a determination that the encrypted access control rules comprise a rule that downloads of the document by the unauthorized user are impermissible, disabling a document download functionality of the container instance to prevent the unauthorized user device from downloading the document.

2. A method for controlling access to private data, the method being implemented using one or more processors of a computing system, the method comprising:
receiving, from a user device, a request to provide access to private data, wherein a set of access control rules for accessing the private data are stored with the private data;
generating a link to a container instance storing an accessible version of the private data;
sending the link to the user device;
detecting, via the container instance, an operation being performed to the accessible version of the private data, the operation comprising a download operation to download, for an unauthorized user device, a copy of at least some of the private data; and
disabling, based on the operation and the set of access control rules, a feature of the container instance to prevent the download operation from being performed to the accessible version of the private data for the unauthorized user device.

3. The method of claim 2, further comprising:
generating a document comprising the private data, wherein the set of access control rules specify how to access the private data via the document;
encrypting the document and the set of access control rules; and
storing the encrypted document using a secure file database.

4. The method of claim 2, further comprising:
inserting an event tracker into the private data, wherein the event tracker tracks at least one of interactions with the private data stored via the container instance or actions performed by a device attempting to access the private data.

5. The method of claim 4, wherein the interactions with the private data comprise at least one of: editing at least some of the private data, downloading the private data, or sharing the private data, and the actions performed by the device attempting to access the private data comprise at least one of: keystrokes executed, touchscreen inputs, mouse inputs, pointer inputs, or screen shots.

6. The method of claim 4, further comprising:

obtaining, from the container instance, event tracker data comprising a set of interactions with the private data detected using the event tracker; and analyzing, using one or more trained artificial intelligence models, the set of interactions to identify one or more patterns of interactions with the private data.

7. The method of claim 6, further comprising:

adding each interaction of the set of interactions to a digital ledger tracking interactions with the private data.

8. The method of claim 2, wherein the request comprises a first request, the accessible version comprises a first accessible version, and the operation comprises a first operation, detecting the operation comprises:

receiving, from the user device, a second request to generate a new link to a new container instance storing a second accessible version of the private data;

sending the new link to the user device;

detecting, via the new container instance, a second operation being performed to the second accessible version of the private data; and causing, based on the second operation and the set of access control rules, the second operation to be performed to the second accessible version of the private data.

9. The method of claim 2, further comprising:

receiving a modification to one or more access control rules of the set of access control rules; and providing an updated set of access control rules comprising the modification to the container instance, wherein the operation is performed or prevented based on the updated set of access control rules.

10. The method of claim 9, wherein the modification comprises an update to at least one of: a number of access attempts permitted, a number of share attempts permitted, download rules, printing rules, sharing rules, or viewing rules.

11. The method of claim 9, wherein the request is received from an authorized user, the set of access control rules comprise resource locators of a set of user devices that the private data is permissible to be shared with.

12. The method of claim 11, further comprising:

generating a container instance for each user device of the set of user devices;

generating a link to each container instance, wherein the link is specific to one of the resource locators of a corresponding user device from the set of user devices; and sending each link to the corresponding user device.

13. The method of claim 2, wherein receiving the request comprises:

receiving a request to upload a document comprising the private data to a secure file database, wherein the secure file database stores an encrypted version of the document, and wherein the set of access control rules are defined with the document.

14. The method of claim 13, wherein the set of access control rules specify actions that are permitted to be performed with the document and (ii) user devices that are permitted to access the document.

15. The method of claim 2, wherein the accessible version of the private data comprises an encrypted version of the private data, and the link comprises a secure link.

16. The method of claim 2, wherein the link is specific to the user device and the container instance is specific to an authorized user associated with the user device.

17. The method of claim 2, wherein the link comprises a Hypertext Transfer Protocol Secure (HTTPS) link to provide a first layer of encryption and the private data is encrypted using one or more encryption algorithms to provide a second layer of encryption.

18. The method of claim 2, wherein disabling comprises:

generating a downloadable version of the private data including a digital signature; and providing the downloadable version of the private data to the unauthorized user device.

19. One or more non-transitory computer-readable media storing computer program instructions that, when executed by one or more processors of a computing system, effectuate operations comprising:

receiving, from a user device, a request to provide access to private data, wherein a set of access control rules for accessing the private data are stored with the private data;

generating a link to a container instance storing an accessible version of the private data;

sending the link to the user device;

detecting, via the container instance, an operation being performed to the accessible version of the private data, the operation comprising a download operation to download, for an unauthorized user device, a copy of at least some of the private data; and disabling, based on the operation and the set of access control rules, a feature of the container instance to prevent the download operation from being performed to the accessible version of the private data for the unauthorized user device.

* * * * *